(12) United States Patent
Silverman

(10) Patent No.: US 6,731,649 B1
(45) Date of Patent: May 4, 2004

(54) TDM OVER IP (IP CIRCUIT EMULATION SERVICE)

(75) Inventor: Hugo Silverman, Tel-Aviv (IL)

(73) Assignee: RAD Data Communication Ltd., Tel Aviv (IL)

( * ) Notice: Subject to any disclaimer, the term of this patent is extended or adjusted under 35 U.S.C. 154(b) by 711 days.

(21) Appl. No.: 09/626,335

(22) Filed: Jul. 26, 2000

(51) Int. Cl.[7] .............................................. H04L 12/66
(52) U.S. Cl. ................ 370/466; 370/395.1; 370/395.52
(58) Field of Search .............................. 370/466, 395.1, 370/401, 474, 352, 353, 395.52, 395.5

(56) References Cited

U.S. PATENT DOCUMENTS

| | | | |
|---|---|---|---|
| 5,548,646 A | | 8/1996 | Aziz et al. |
| 5,623,605 A | * | 4/1997 | Keshav et al. |
| 5,715,250 A | | 2/1998 | Watanabe |
| 5,903,559 A | | 5/1999 | Acharya |
| 5,936,936 A | | 8/1999 | Alexander, Jr. et al. |
| 5,936,965 A | | 8/1999 | Doshi et al. |
| 5,946,313 A | | 8/1999 | Allan et al. |
| 6,459,708 B1 | | 10/2002 | Cox et al. |
| 6,519,261 B1 | * | 2/2003 | Brueckheimer et al. ...................... 370/395.52 |
| 6,574,224 B1 | * | 6/2003 | Brueckheimer et al. . 370/395.6 |
| 6,603,850 B1 | * | 8/2003 | Stahl et al. ............ 379/221.02 |

* cited by examiner

*Primary Examiner*—Kenneth Vanderpuye
(74) *Attorney, Agent, or Firm*—Katten Muchin Zavis Rosenman (57) ABSTRACT

A method and system for processing one or more TDMs for communication over IP networks, such as the Internet, includes encapsulating ATM cells (packets) using AAL1 cells within UDP over IP frames to provide synchronous bit streams into fixed size cells. This allows for an IP header to be added to the packets, with such packets forwarded to its destination host across the IP network. The destination regenerates the clock, decrypts/strips the IP header and delivers a synchronous bit stream. Furthermore, an adaptive clock is provided for clock transfer across the network. The adaptive clock regenerates the far end T1/E1 receive clock out of the incoming arrival frame rate. Frames arriving from the IP network are stored in a buffer and taken out for TDM stream assembly.

41 Claims, 4 Drawing Sheets

TDM OVER IP (IP CIRCUIT EMULATION SERVICE)

BACKGROUND OF THE INVENTION

1. Field of Invention

The present invention relates generally to the field of communications. More specifically, the present invention is related to a system and method for transferring TDM data over packet switched networks, such as IP networks.

2. Discussion of Prior Art

T-1 (DS1) trunks are circuit switched data networks supporting data rates of 1.544 Mbits per second. A T-1 trunk can carry 24 individual 64 Kbits per second channels, each of which may carry data or telephony quality voice. Similarly, E1 trunks are circuit switched data networks supporting data rates of 2.048 Mbps (32 channels at 64 Kbps). T-3 and E3 trunks support data rates of 44,736 and 34,368 Kbps, respectively. Together T1, E1, T3, E3 and similar circuit switched serial networks are known as TDM networks.

TDM, short for Time Division Multiplexing, is a type of multiplexing that combines data streams by assigning each stream a different time slot in a set. TDM repeatedly transmits a fixed sequence of time slots over a single transmission channel. Within T-Carrier systems, such as T-1 and T-3 (DS3), TDM combines Pulse Code Modulated (PCM) streams created for each in conversation or data stream.

ATM, short for Asynchronous Transfer Mode, represents a network technology based on transferring data in cells of a fixed size. The cell used with ATM is relatively small (53 bytes) compared to units used with older technologies. The small, constant cell size allows ATM equipment to transmit video, audio, and computer data over the same network, and assure that no single type of data hogs the line.

Current implementations of ATM support data transfer rates of from 1.544 (T1) to 622 Mbps (megabits per second). This compares to a maximum of 1000 Mbps (GbETH) for Ethernet, the current technology used for most LANs. ATM over IP pseudo OSI layers comprise an upper protocol, ATM Service Specific Convergence Sublayer (ATM-SSCS), necessary to translate between the ATM layer and RTD/UDP/IP sublayers. The User Datagram Protocol (UDP) is a connectionless protocol that, like TCP, runs on top of IP networks. Unlike TCP/IP, UDP/IP provides very few error recovery services, offering instead a direct way to send and receive data grams over an IP network. Sub-layers provide the Ethernet type, MAC header and PHY Ethernet respectively.

High-speed IP-based networks are the latest innovation in the world of communications. The capacity of these networks is increasing at a prodigious rate, fueled by the popularity of the Internet and decreasing costs associated with the technology. Worldwide data traffic volume has already surpassed that of the telephone network, and for many applications, the pricing of IP traffic has dropped below the tariffs associated with traditional TDM service. For this reason, significant effort is being expended on VoIP technologies. For users who have free, or fixed-price Internet access, Internet telephony software essentially provides free telephone calls anywhere in the world. To date, however, Internet telephony does not offer the same quality of telephone service as direct telephone connections. There are many Internet telephony applications available. Some come bundled with popular Web browsers; others are stand-alone products. Internet telephony products are sometimes called IP telephony, Voice over the Internet (VOI) or Voice over IP (VOIP) products.

Inherent in all forms of VoIP is revolutionary change, whereby much of the existing telephony infrastructure will be replaced by novel IP-based mechanisms. Despite the hype, this effort has been more protracted and less successful than initially expected. Today's telephony technology, both those portions that VoIP aims to replace and those to which VoIP must interface, is extremely complex. Revolutionary implementations of its hundreds of features and thousands of variations cannot be expected to be developed in a short time frame.

The present communications revolution has been focused on the Internet and the Internet protocol (IP). The prior art, however, has failed to teach a viable solution to handling TDM over Internet Protocol (IP). In addition, the use of TDM over IP for Voice over IP has not been heretofore possible.

Why Use IP Networks? The existing telephony infrastructure has an extremely high reliability (99.999%), supports reasonable audio quality (Mean Opinion Score, or MOS, 4.0 on a scale of 1 to 5), has almost universal market penetration, and offers a rich feature set. Accordingly, extremely potent incentives are required before one should consider supplanting it. There are two such incentives, one economic and one technological.

The part of the economic advantage of IP networks is shared by all packet networks; namely, that multiple packetized data streams can share a circuit, while a TDM timeslot occupies a dedicated circuit for the call's duration. Under "polite conversation" assumption of each party speaking only half of the time, and the "optimal engineering" assumption of minimal overhead, packet networks will, on average, double the bandwidth efficiency, thus halving operational costs. Taking overhead and peak statistics into account, the savings will be somewhat less, but a 30% reduction is attainable. However, it is doubtful whether this savings alone would be a strong enough encouragement to make the switch from TDM to IP.

The added catalyst has to do with the raw rates for data traffic as compared to voice traffic. At present, data communications are metered separately from traditional voice communications and are offered at substantial savings. These savings are partly due to tariffs and access charges that increase the cost of traditional voice services, and partly due to the attractive pricing of IP traffic. Put another way, voice service pricing is still mostly determined by incumbent carriers with high overhead costs, while IP traffic costs are much more competitive, as the provider incurs lower costs and is more focused on increasing market share.

The technological incentive has come to be called convergence. The reasoning is that technological simplification and synergy will result from consolidation of the various sources into an integrated environment. For example, a single residential information source provisioned for telephony, IP data and entertainment programming would in principle decrease end user prices, result in a single unified billing package, and eventually enable advanced services, such as video-on-demand.

The Limitations of VoIP

In principle, it would not seem difficult to carry voice over IP networks; a digitized voice signal is simply data and can be carried by a packet network just like any other data. The major technological achievement of the telephone network, that of least cost routing, has its counterpart in IP networks as well. There are, however, two fundamental problems that have to be solved before VoIP can be realistically considered to compete with TDM networks; namely, QoS and signaling.

Quality of Service

The meaning of Quality of Service is completely different for data and voice. Although most data can withstand relatively significant delay, low delay and proper time ordering of the signal are critical for voice applications, even though loss of a few milliseconds of signal is usually not noticeable. These requirements are completely at odds with the basic principles of IP networks (although not necessarily with those of other packet networks). To overcome these constraints, mechanisms such as tunneling and jitter buffers need to be employed. Additional components of voice quality such as echo cancellation and voice compression are not inherent in data-based networks at all, and need to be added ad hoc for VoIP.

Almost all of the massive R&D effort in the field of VoIP is directed towards solving these QoS problems, leaving the signaling problem largely unsolved. By signaling, we mean the exchange of information needed for a telephone call other than the speech itself Signaling consists of basic features such as the fact that the phone is off-hook or needs to ring; more advanced properties required for reaching the proper destination and billing; and still more sophisticated characteristics, such as caller identification, call forwarding, and conference calls; as well as more recent additions necessitated by intelligent networking. There are literally thousands of such telephony features, with dozens of national and local variations. Phone customers are mostly unaware of this complexity, at least until you try to deprive them of any of the features to which they have become accustomed.

Adding auxiliary information to digital voice on an IP network is in principle much simpler than signaling in telephone networks. One needn't "rob bits" or dedicate CAS channels. One need only send the signaling data in some appropriate format along with the voice. Indeed, the advantage of VoIP is that it becomes possible to add features that could not exist in the classic telephony world, for example video and "whiteboards." This is true as long as the two sides to the conversation are using special VoIP terminals or computers. The problems arise when one must interface between the IP network and the standard telephony network, a connection that is imperative in light of the universal availability of standard telephone sets.

VoIP enthusiasts often emphasize conversations between two PC users or a PC user conversing with a telephone user. Consider instead a conversation between two telephone users, each connected via a standard Local Loop to a central office, but with an IP-based network replacing the TDM network between the central offices. To properly pass the requisite signaling, the IP network has to be enhanced to handle all the thousands of features and their variations (for example, 911 and *67 service). Although not an impossible task, it is one that VoIP developers have not yet accomplished.

Each of the below described references teach methods for communications using differing protocols, such as ATM over IP, across various communication standards. However, none of the references provide or suggest the present invention method of TDM over IP.

The patent to Keshav et al. (5,623,605), assigned to Lucent Technologies, Inc., provides for *Methods and Systems for Interprocess Communication and Inter-Network Data Transfer*. Disclosed is the transmission of data packets between source and destination devices wherein generated and received data are in ATM-formatted frames and the network transmits data in Internet protocol packets. Such data transfer is accomplished using encapsulators and decapsulators to encapsulate ATM formatted frames in data portions of IP packets for transmission on the network. (See Column 2, Line 59—Column 3, Line 25).

The patent to Allan et al. (5,946,313), assigned to Northern Telecom Limited, provides for a *Mechanism for Multiplexing ATM AAL5 Virtual Circuits over Ethernet*. This reference describes a method for encapsulating/segmenting ATM cells over Ethernet.

The patent to Aziz et al. (5,548,646), assigned to Sun Microsystems, Inc., provides for a *System for Signatureless Transmission and Reception of Data Packets Between Computer Networks*. Aziz et al. disclose a system for automatically encrypting (by adding an IP header) and and decrypting a data packet sent from a source host to a destination host across a network (See Column 2, Lines 13+).

The patent to Doshi et al. (5,936,965), assigned to Lucent Technologies, Inc., provides a *Method and Apparatus for Transmission of Asynchronous, Synchronous, and Variable Length Mode Protocols Multiplexed over a Common Bytestream*. This reference describes a system for supporting the transmission and reception of ATM over a common bytestream with a common physical layer datalink.

The patents to Watanabe (5,715,250—*ATM-LAN connection apparatus of a small scale capable of connecting terminals of different protocol standards and A TM-LAN including the ATM-LAN connection apparatus*); Acharya et al. (5,903,559—*Method for Internet protocol switching over fast A TM cell transport*), and Alexander, Jr. et al. (5,936,936—*Redundancy mechanisms for classical Internet protocol over asynchronous transfer mode networks*) provide a general teaching of IP over ATM.

The non-patent literature entitled "Pathbuilder S200 Voice Access Switches" http://searchpdg.adobe.com/proxies/1/70/33/43.html, provides for TDM-based voice and data traffic over frame relay or IP WAN Infrastructures.

The non-patent literature entitled "Project: Gateway Application—ATM<—>IP," http://www.cse.ucsc.edu/~rom/projects/atm_ip/atm_ip.html, describes an ATM driver over an IP driver.

The present invention offers a solution for transferring transparently E1 or T1 (or fractional E1/T1) TDM services over widely deployed high speed IP networks. This technology can be used as a migration path to Voice over IP or a complementary solution to VoIP in places where voice over IP solution is not suitable. The same TDM over IP approach can be adopted to transfer other TDM rates (e.g., E3/T3, STM1 etc.) over the IP network. Throughout the specification, claims and drawings various TDM rates may be substituted without departing from the scope of the present invention.

Whatever the precise merits, features and advantages of the above cited references, none of them achieve or fulfills the purposes of the present invention. These and other objectives are achieved by the detailed description that follows.

SUMMARY OF THE INVENTION

A method and system for processing one or more TDMs trunks for communication over IP networks, such as the Internet, includes encapsulating ATM cells (packets) using AAL1 cells within UDP over IP frames to provide synchronous bit streams into fixed size cells. This allows for an IP header to be added to the packets, with such packets forwarded to its destination host across the IP network. The destination regenerates the clock, decrypts/strips the IP header and delivers a synchronous bit stream. Furthermore, an adaptive clock is provided for clock transfer across the network. The adaptive clock regenerates the far end T1/E1 receive clock out of the incoming arrival frame rate. Frames arriving from the IP network are stored in a buffer and taken out for TDM stream assembly.

DESCRIPTION OF THE PREFERRED EMBODIMENTS

While this invention is illustrated and described in a preferred embodiment, the device may be produced in many different configurations, forms and materials. There is depicted in the drawings, and will herein be described in detail, a preferred embodiment of the invention, with the understanding that the present disclosure is to be considered as a exemplification of the principles of the invention and the associated functional specifications for its construction and is not intended to limit the invention to the embodiment illustrated. Those skilled in the art will envision many other possible variations within the scope of the present invention.

The present method and apparatus provide an alternative method of exploiting IP networks for telephony service that is evolutionary rather than revolutionary. This method uses IP networks as a drop-in replacement for native TDM networks. It seamlessly interfaces to all existing equipment, such as legacy PBXs and switches, and inherently provides all the hundreds of telephony features and the PSTN quality to which customers have become accustomed. This alternative is circuit extension over IP using TDMoIP. Another advantage is a simple gateway between ATM CES and TDM over IP.

In order to explain the principles of TDMoIP we need first to recall those of TDM. A T1 frame consists of 24 single-byte timeslots and a single synchronization bit, for a total of 193 bits. An E1 frame consists of precisely 32 bytes (256 bits), one of which is used for synchronization and one traditionally reserved for signaling. In both cases, frames are transmitted 8,000 times per second.

The following two solutions represent possible, but potentially flawed, alternative approaches to implement TDM over IP. The simplest implementation of TDMoIP encapsulates each T1 or E1 frame in an IP packet by tacking on the appropriate header. Since the packets provide the segmentation, the synchronization bit/byte need not be included. Accordingly, the payload length is 24 or 31 bytes for T1 or E1, respectively. For reliable connection-oriented service one might consider using TCP/IP, which requires a 20-byte TCP header and a 20-byte IP header, for a total of 40 overhead bytes per packet. The end-to-end reliability offered by TCP, however, is not useful for voice packets since re-transmitted voice packets will reach the receiving side out of order and be dropped anyway. A more reasonable alternative would be the real-time transport protocol RTP, with its header of at least 12 bytes, to which one must add an 8-byte UDP header and the IP header, resulting in the same overhead. A 40-byte overhead for a payload of 24 or 31 bytes is indeed a bit extravagant, but there are two solutions to this problem.

The first solution involves header compression schemes. RFCs exist that reduce the average header of both TCP and RTP to only three bytes, diminishing the overhead percentage to between eight and nine percent.

The second solution involves grouping together multiple frames into a super-frame before encapsulation. For example, grouping eight T1 (E1) frames results in a payload of 192 (248) bytes, so that the overhead percentage drops to a reasonable 17 (14) percent. Grouping does add a certain amount of buffering delay, but since each frame is only 125 m sec in duration, this latency is negligible as compared with that of VoIP systems. For example, a super-frame comprised of eight successive frames introduces a one millisecond one-way delay, about half that of the standard 16 kbps low delay encoder used in VoIP, and much lower than the 15 millisecond delay of the 8 kbps encoder.

Simple encapsulation of the raw frames is not the only way of implementing TDMoIP. Alternative approaches first encode the TDM data in some other protocol before IP encapsulation. There are many advantages to imposing another layer of protocol between the TDM and the IP. Intermediate encoding may be employed when the natural TDM-induced frame sizes are not appropriate; to provide error correction; to enable interoperability with other systems; and to allow us to compress the speech or to enhance QoS.

Circuit Emulation Service (CES) is already a well-established standard in ATM and is defined by ATM Forum (AF-VTOA-0078)—Circuit Emulation Service Interoperability Specification Version 2.0—CES 2.0—CES 2.0 (1997); using AAL1 cells is defined by ITU-T I.363.1— ATM Adaptation Layer Specification: Type 1 AAL (1996). These standards already give solutions for CES implementation for different modes of operation:

Unstructured—Full E1/T1 transparent service.

Structured—Fractional E1/T1 transparent service.

Structured with CAS—Fractional E1/T1 with CAS transparent service.

The present invention IP CES is based on ATM CES using AAL1 cells without ATM cell header) encapsulated in IP frames; by adopting this strategy only minimal regulatory activity is needed to set this service standard. The same methods can be equally adopted for DBCES (Dynamic bandwidth CES over AAL1) or AAL2 encapsulated within IP frames without departing from the scope of the present invention. ATM cells (stripped from cell header) will be encapsulated within UDP over IP frames. Addressing comprises use of the UDP source port field to specify the destination of the AAL1 cells termination inter working function at the receiving device (will define the 'connection')

The IP network is not a Synchronous network and a common clock is not available at its nodes, while TDM services and CES functionality require synchronous timing at both ends. The present invention substitutes for clock transfer across the network an adaptive clock method, described hereafter. The adaptive clock is a method to regenerate the far end E1/T1 receive clock out of the incoming arrival frame rate. Frames arriving from the IP network are stored in a buffer and taken out for TDM stream assembly, the fill level of this buffer is monitored and uses to adjust a PLL. When the buffer is filling up the regenerated clock rate will be increased and when the buffer is getting empty the regenerated clock rate will be decreased.

Figure 1:
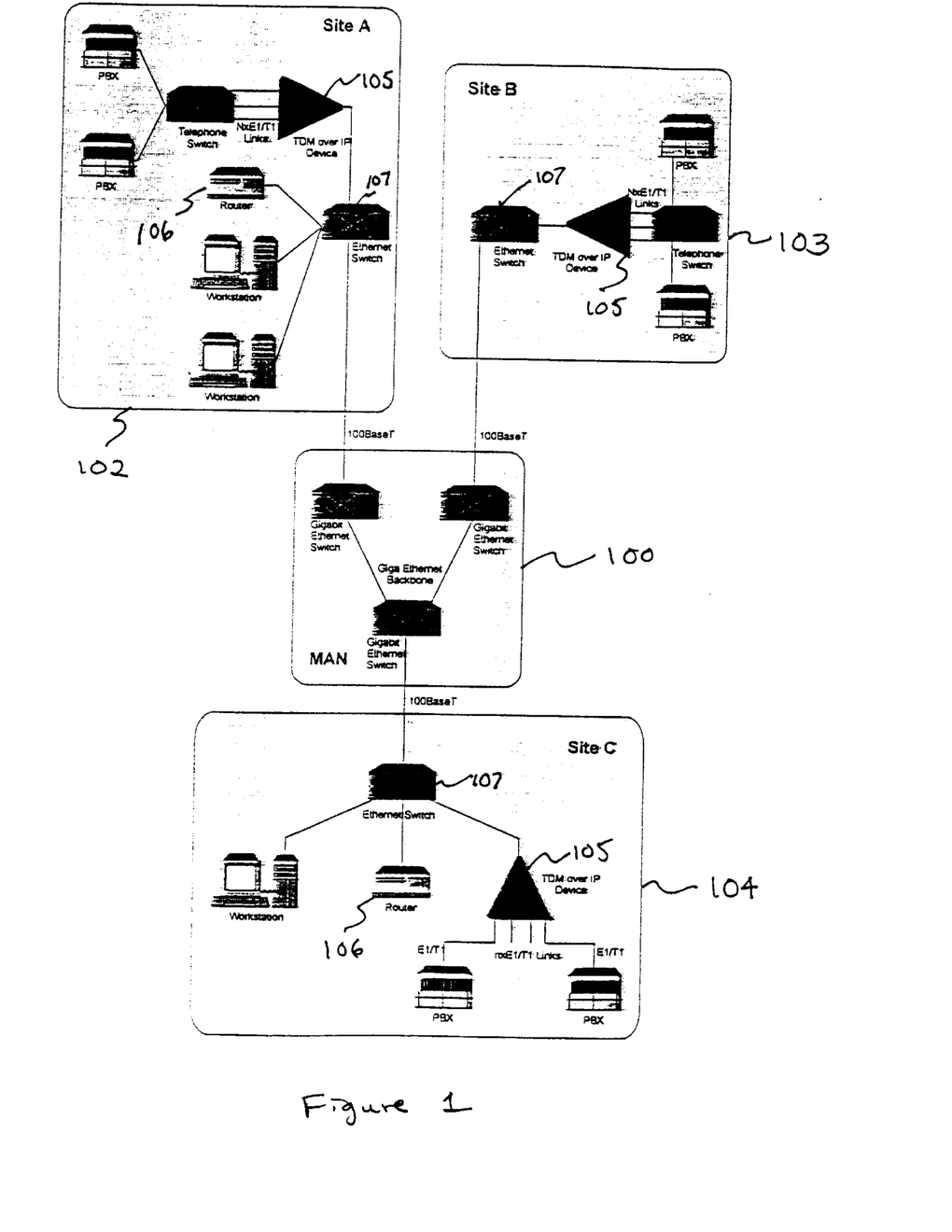
FIG. 1 illustrates an overall implementation of the present invention TDM over IP.

FIG. 1 illustrates one embodiment of a communications infrastructure using the present invention. This is a typical application where a fast IP backbone based Metropolitan Area Network (MAN) 100 is used to interconnect several sites (102, 103 and 104) to create a private network which handles both organization data and voice. One can see that the organization PBX's at all 3 locations A,B and C (102, 103 and 104) are connected by a TDM over IP device 105 to give transparent TDM links over the MAN IP backbone. 'TDM' packets can be tagged by a ToS field in the IP header to get high priority when going through the IP network. Data connectivity is given on the same network (A and C) by routers 106 connected to the IP backbone. At all sites the access to the network is done by an Ethernet switch 107 connecting both TDM over IP device 105 and organization data to the MAN 100.

Figure 2:
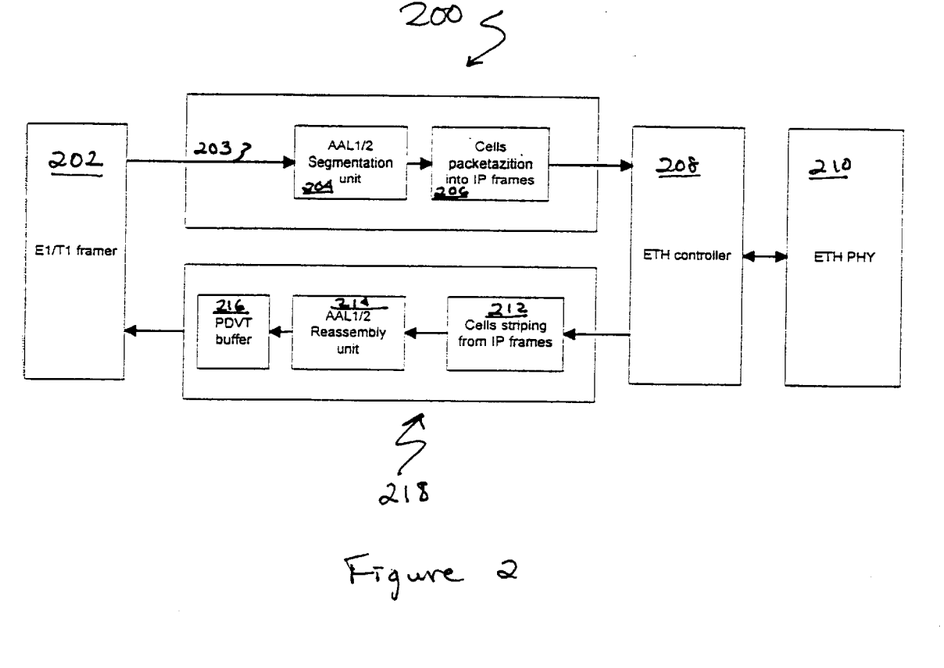
FIG. 2 illustrates a block diagram of the functional units of the present invention.

FIG. 2 illustrates a block diagram of the present invention system with downlink path 200 converting E1/T1 TDM to IP Ethernet compatible protocols and an uplink path 218 converting IP Ethernet to E1/T1 TDM compatible protocols. E1/T1 framer 202 decodes incoming TDM signals from line and frame alignment. A PCM bus 203 is the output from the E1/T1 framer 202 to the next block, AAL1/2 segmentation unit 204. The TDM bit stream is packed into AAL1/2 cells by the segmentation unit. The next block 206 packs the cells (with no cell header) into UDP over IP frames. The packets are transferred to an Ethernet controller 208 that transmits using Ethernet PHY device 210.

In the uplink path 218, packets received by the Ethernet PHY 210 are transferred to the Ethernet controller 208 and from it to a unit 212 that strips the cells out of a UDP payload. The received cells arrive to the AAL1/2 reassembly unit 214 that takes out the TDM bytes out of the cells and store them in a PDVT buffer 216. The PDVT (Packet Delay Variation Tolerance) buffer is a unit designed to absorb network PDV. Generally the PDVT buffer works as follows. TDM bytes are stored into the buffer, the buffer is not being emptied to the E1/T1 stream until reaching it's half full size (the PDVT required), that way the PDVT buffer ensures the packets late or early up to it's half full size will not cause buffer overflows or underflows and E1/T1 traffic will not be damaged (the PDVT is described hereafter in greater detail—see FIG. 4 and corresponding discussion). The E1/T1 TDM stream is then transferred to the E1/T1 framer 202 and out to the TDM line.

Figure 3:
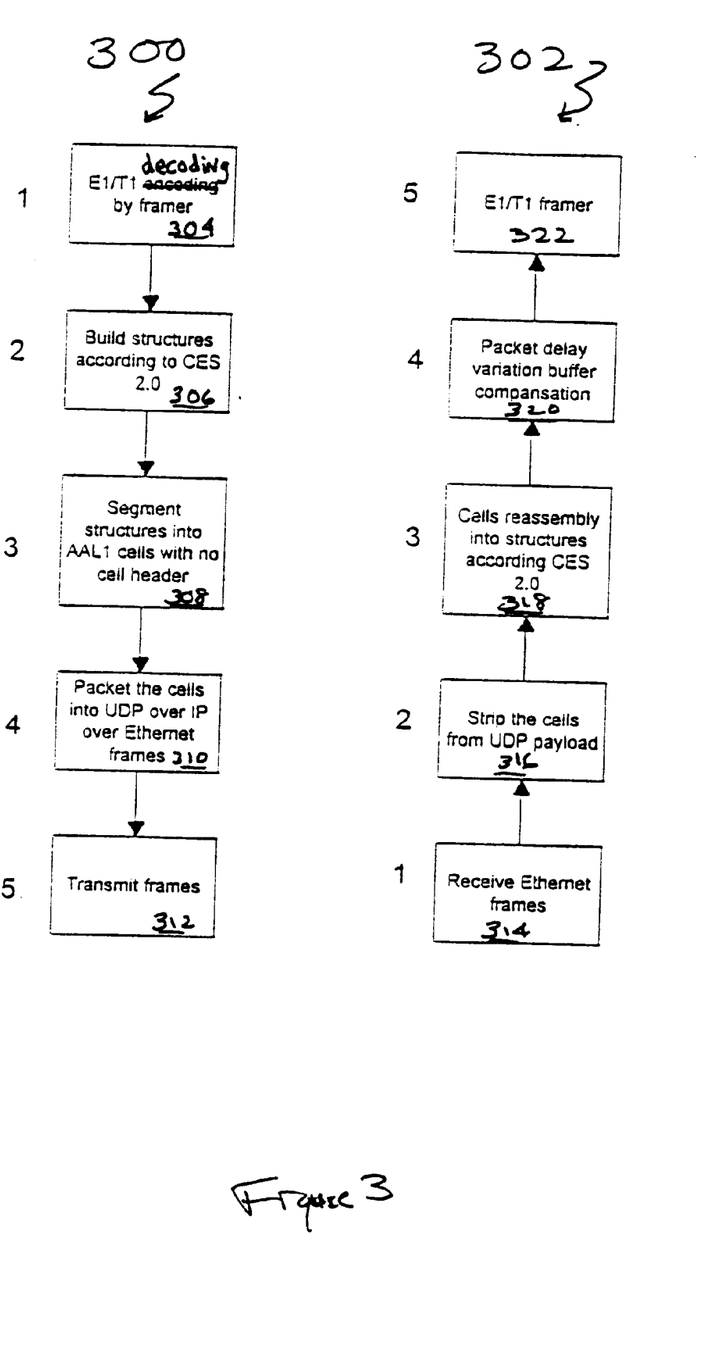
FIG. 3 illustrates a flow diagram of receive and transmit paths.

FIG. 3 illustrates a flow diagram of the down 300 and up link 302 paths.

In the down link path 300, the following steps occur:
Step 304 —Decode E1/T1 signals from line and frame alignment, the output from this module being a PCM bus.
Step 306—The PCM input is arranged in structures as defined in AF-VTOA-0078 CES 2.0 (1997). 3 modes are available:
Unstructured—for fully E1/T1 transparent mode.
Structured—for transfer of all or several time slots (1–31).
Structured with CAS—for transfer of time slots with their CAS bits.
Step 308—Segmentation of these structures into cells as defined in ITU-T 363.1.
Step 310—Packetize the cells, without adding ATM headers, only AAL1 headers and payload, into UDP over IP frames adding connection information into UDP header (beside destination IP specifying the remote device other addressing is needed to specify destination E1/T1 port and bundle which is a group of time slots). This addressing information can be put in the UDP source port.
Step 312—Frames ready are transmitted to the IP Ethernet.

In the down link path 300, the following steps occur:
Step 314—IP Ethernet Frames are received.
Step 316—extract cells from the UDP payload.
Step 318—Structures are reassembled from the cells according ITU-T I.363.1 and AF-VTOA-0078 CES 2.0 (1997).
Step 320—absorb network delay variation using a Packet delay variation buffer.
Step 322—TDM data is framed, encoded and transmitted over the E1/T1 TDM line.

It is important to note that TDMoIP in unstructured mode transparently transports TDM frames without any attempt at interpreting the data. It is completely oblivious to such TDM internals as time slots, signaling channels, etc. Thus TDMoIP can be used to transport arbitrary T1/E1 services, even if some of the channels are actually used to carry data or if the entire frame is an unstructured bit-stream. Similarly, the basic TDMoIP concept can be extended to fractional T1 or channelized E1 systems. To reduce traffic, only the information carrying bytes need be included in the IP packet.

How does TDMoIP solve the signaling problem inherent in interfacing between IP networks and the telephony network? To answer this question we should differentiate between three types of signaling: in-band, CAS and CCS.

In-band signaling, as its name implies, is transferred in the same audio band as the speech. It can take the form of call progress tones such as dial tone and ring back, DTMF tones, FSK for caller identification, MFR1 in North America or MFCR2 in Europe, etc. Since these are all audible tones, they are encoded in the TDM timeslot and automatically forwarded by TDMoIP. Speech compression algorithms used by VoIP systems often do not pass these tones well. Therefore, VoIP systems need to implement tone relay protocols to ensure that in-band signaling functions properly.

The most common CAS, or channel associated signaling, is carried in the same T1 or E1 frame as the voice signals, but not in the speech band. T1 robs bits for this purpose while E1 devotes an entire timeslot to carry four bits for each of the 30 remaining channels. Since CAS bits are carried in the same T1 or E1 stream, once again they are automatically forwarded by TDMoIP. We take the same approach in TDM over IP as in VoIP by terminating the CAS and forwarding it . This is not a problem and does not add much complexity because CAS are only 4 bits per channel (maximum 16 combinations with low rate of change).

SS7 is a CCS, or common channel signaling, method. SS7 links are 56 or 64 kbps data links and are thus often found occupying a TDM timeslot. In such cases, they are automatically forwarded by TDMoIP. If not, one can get the required information already in IP format from a SS7 signaling gateway, and readily forward it as additional traffic through the network without any further processing.

Up to now we have ignored another function available in customary TDM networks, that of time synchronization. In the public switched telephone network (PSTN)—and in SONET/SDH networks—one node, called the clock master, provides a time reference to the other, called the slave. Somewhere in the network there is at least one extremely accurate primary reference clock, with long term accuracy of one part in $10^{11}$. This node, the accuracy of which is called stratum 1, provides the reference clock to secondary nodes with stratum 2 accuracy, and these in turn provide a time reference to stratum 3 nodes. This hierarchy of time synchronization is essential for the proper functioning of the network as a whole.

Packets in IP networks reach their destination with delay that has a random component, known as jitter. When emulating TDM on an IP network, it is possible to overcome this randomness by using a buffer to smooth out all incoming data, assuming the proper time reference is available. For the most part, however, the original time reference information is no longer available.

Figure 4:
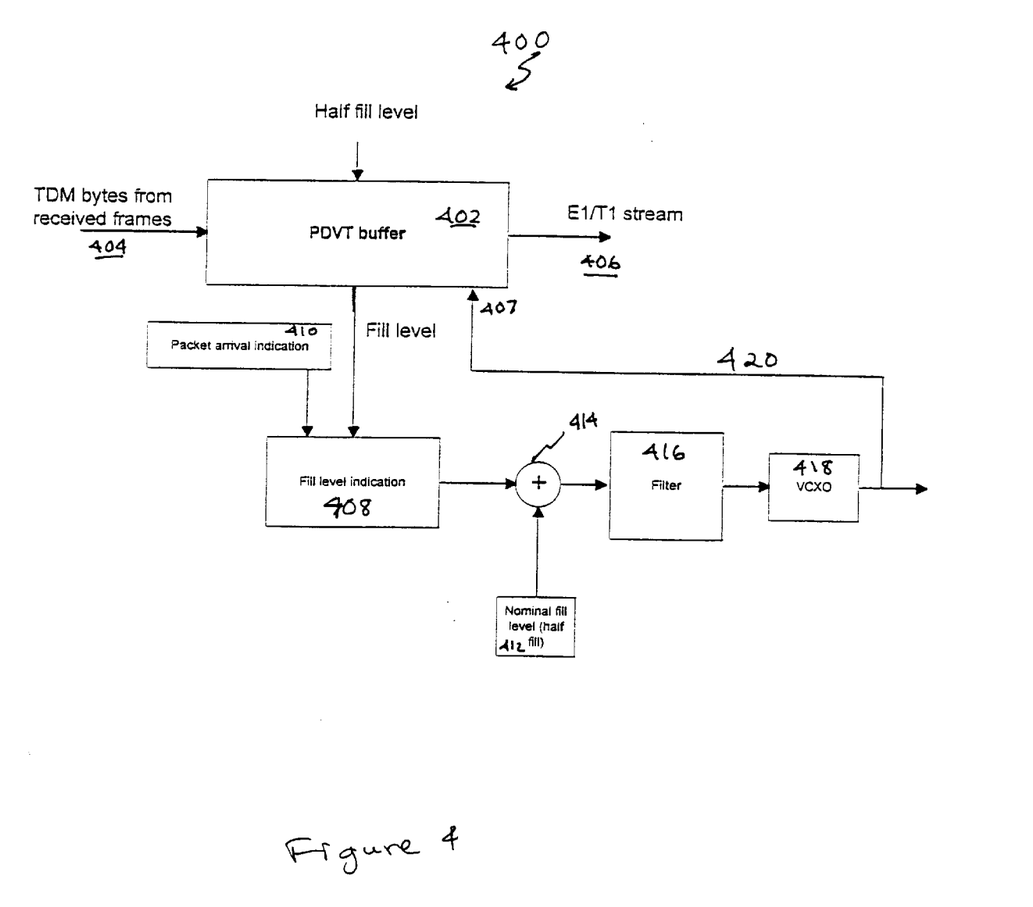
FIG. 4 illustrates an adaptive clock method for TDM over IP.

FIG. 4 illustrates the block diagram of one possible adaptive clock generation method.

PDVT buffer 402 is loaded with TDM bytes 404 extracted from the arriving frames.

PDVT is emptied to the E1/T1 stream 406 in a rate set by the TX clock 407 (adaptive clock in this case).

PDVT buffer 402 is started to be emptied only after filling up to it's half fill level; this way delay variation tolerances are noted at it's half fill level. Fill indication 408 is generated upon arrival 410 of a frame reflecting the buffer fill level at this time.

The fill indication 408 is compared to the nominal fill level 412 (half fill).

The output (updated upon frame arrival) can be in 2 forms that represent 2 options for the implementation:
1. 414 will have a single TTL output indicating if the buffer is less then half full ('1') or more then half full ('0').
2. The area around the half fill level of the buffer is divided into several areas (16 for example) which each one of them represents a frequency in the range of E1/T1 rates+−50 ppm . According to the fill level at the frame arrival the corresponding frequency will be synthesized. At this method the -output of 414 will be a voltage level representing the desired frequency to synthesize. In this scheme 414 will also contain a D/A functionality.

The output may be filtered 414 to filter 416 network delay variation (low frequencies) and is an input to a VCXO 418 to produce the Adaptive clock 420 fed to input 407.

The generated clock is used (as mentioned before) to clock out the TDM bytes out of the PDVT buffer 402.

In principle there are two different levels of integration of TDMoIP into the telephone network. In the toll bypass scenario, a competitive carrier introduces an alternative link, based on TDMoIP, between two central offices. Due to the cost advantages discussed above, "toll bypass" services can be offered to customers at a lower rate than the incumbent's rate. In such applications, both TDMoIP devices should receive a time reference from the central offices to which they connect.

In the whole network scenario, major portions of the primary infrastructure are replaced with TDMoIP networks, and a method of time synchronization is required. IP networks also disseminate clock information through a protocol known as NTP; but unless the IP network is completely private and dedicated to the TDMoIP link, there will be no connection between the NTP clock and the desired TDM one. One solution is to provide time standards, such as atomic clocks or GPS receivers, to all TDMoIP devices, thus relieving the IP network of the need to send synchronization information. When the provision of accurate local time references is not possible or too costly, then recovery is possible when the destination regenerates and synchronizes the clock.

TDMoIP is simpler than VoIP because it is transparent to voice and data signaling and protocols, even when they are proprietary. VoIP, on the other hand, still has issues with new protocols and translation between signaling formats. VoIP does hold the promise of new applications, whereas TDMoIP automatically takes advantage of existing PBX and CTI features. As far as bandwidth optimization, VoIP gateways include voice compression and silence suppression and therefore reduce bandwidth requirements. However, this is at the expense of lower quality and higher latency. The simplicity of TDMoIP translates into lower cost of ownership with initial expenditure savings and operational cost benefits. These savings are significant for the enterprise consumer who is typically not interested in replacing his legacy TDM equipment and dealing with "forklift upgrades" with the associated training and maintenance expenses. Another important difference is that due to transparency, TDMoIP can offer mixed voice-data services.

From a service provider point of view, TDMoIP and VoIP complement each other. Extending TDM trunks over the IP network transparently from the customer site to the carrier POP makes it simple for the carrier to deploy larger, scalable VoIP gateways and softswitches at the POP where resources are available, and provide the user with a simple TDMoIP Network Termination Unit (NTU) at the customer premises. These TDMoIP circuits could then be used to provide a number of services in addition to VoIP, such as regular PSTN access, Centrex, Frame Relay and ISDN.

TDMoIP provides many of the benefits of ATM in that end-to-end delay starts at less than 2 ms and integrity of structured or unstructured T1s or E1s is maintained. TDMoIP is much simpler, cheaper and more efficient than ATM. Most importantly, it can be carried over IP and Ethernet networks. TDMoIP is more efficient than ATM because its payload size and therefore percentage of overhead can be set on a per-application basis. This is possible because the number of octets per frame is configurable. With ATM, payload is always 48 bytes, and therefore the percentage of overhead is much higher.

Gigabit Ethernet (and 10-Gigabit Ethernet) are being used in Metropolitan Area Networks (MANs) and Wide Area Networks (WANs). In particular, Gigabit Ethernet over dark fiber is becoming a popular alternative to SONET and ATM. However, Ethernet is basically a data network technology and cannot by itself handle voice traffic. TDMoIP empowers Gigabit Ethernet with voice and circuit extension capabilities and therefore is an excellent complementary technology. Together these technologies are expected to increase market share by offering a simpler, less expensive alternative to VoIP, ATM and SONET. History shows that the simpler, cheaper technologies such as Ethernet and Frame Relay tend to prevail over the more complex and expensive alternatives such as FDDI, ATM and Token Ring, even if the latter are more robust.

Initial concerns regarding simpler technologies like Gigabit Ethernet are usually rapidly put to rest by subsequent enhancements. For example, a SONET ring topology is considered very reliable because of its rapid recovery from a failure or fiber cut. Gigabit Ethernet does not inherently have this capability, but an alternate trunk can usually be switched within a few milliseconds. Even if there is only a single fiber between the switches, protocols such as OSPF enable routing tables to be updated within a few seconds, and the IP data stream to be quickly reconnected.

Another important example relates to QoS, where ATM has the most defined service level categories. However, today's Gigabit Ethernet switches and Terabit routers implement advanced mechanisms to prioritize packets and reserve bandwidth for specific applications. By marking TDMoIP packets (using 802.1p&q, ToS, and set UDP port numbers) they may be easily identified and prioritized.

Combining TDMoIP with Gigabit Ethernet switches and Terabit routers ensures a worthy A alternative to SONET and ATM, providing a simpler, more cost-effective solution with more bandwidth and more efficient grooming of T1 s or E1s to Gigabit optical networks.

At the local level, one finds three types of service providers offering connectivity services for voice and data. These include incumbent local exchange carriers (ILECs) which formerly had a monopoly on local services; the state-certified competitive local exchange carriers (CLECs), which compete either by building their own facilities or by leasing "unbundled" facilities for resale from the ILEC; and the ISPs that provide Internet access as well. Sometimes the ISP is a subsidiary of the ILEC, but state regulation means that these ISPs must be customers of the ILEC, just like everyone else. This arrangement retains the split between basic transport and enhanced services. In addition to providing pure Internet access, ISPs are also offering Web and application hosting for the business user. Enhanced services such as unified messaging and VoIP are being targeted at the residential and small business customer. VoIP is also being used to offer savings on international calls, and once QoS is assured we can expect to see more businesses adopt this technology. In fact, CLECs are becoming ISPs by offering data services and ISPs are becoming CLECs by offering IP telephony.

Network unbundling, the process of breaking the network into separate functional elements, opens the local access area to competition. CLECs select unbundled components they need to provide their own service. If the unbundled price is still too expensive, the service provider will provide its own private resources or turn to an alternative access vendor (AAV), which can offer private line service between an entity and facilities at another location. Innovative providers will take advantage of whatever technology is available to attack the competition, including wireless microwave systems, leased dark fiber, infrared and laser-based wireless and CATV.

Next Generation carriers employ wireless for its easy deployment and fiber for its bandwidth. Additional new breeds of CLEC have emerged, such as the data CLEC or DLEC that deliver high speed Internet connectivity and other data offerings, or the building CLEC or BLEC that wire commercial buildings with fiber optic cable to provide Shared Tenant Service (STS).

Despite the technological and structural advances, the new carriers must still tackle the problem of grooming T1 circuits onto optical and wireless networks.

Interexchange carriers provide telecommunications service between local calling areas. The IXCs have to pay access charges to the ILECs and therefore have an interest in being offered competitive basic transport services from facilities-based CLECs with alternative access solutions. IXCs with spare capacity can take advantage of this available bandwidth for circuit extension services across their own packet networks. Circuit Extension over IP benefits the IXC because it offers more local access alternatives and more options for providing voice trunking solutions to their customers across their own IP networks.

Applications

Competitive local exchange carriers (CLECs) can take advantage of TDMoIP technology to expand their market share quickly, simply and inexpensively with more points of presence (POPS) and more services. Incumbent local exchange carriers (ILECs) providing basic transport of circuits wholesale to the CLEC can use TDMoIP to extend the T1 or E1 circuits cost-effectively over optical or wireless links back to the CLEC Service POP.

Building, Data or other Competitive Local Exchange Carriers or utility companies can increase their revenues by taking advantage of their wireless or optical data networks and use TDMoIP to extend T1 or E1 circuits between an entity and facilities at another location. In this way, the service provider can bundle private line services in addition to broadband data. Bundled services could include:

High speed Internet access, Web hosting and VLAN

Traditional PSTN access, or Centrex service, by extending circuits from the class 4/5 switch at the CO to the customer site New voice and unified messaging services using VoIP gateways or switches and extending circuits to the remote site Private line services Local Loop access to ATM, Frame Relay, ISDN and X.25 networks The TDM over IP device offers unprecedented flexibility to carriers looking for low cost extension of T1 or E1 services over an IP or Gigabit Ethernet network. Some emerging applications are shown on the following pages.

T1/E1 Circuit Extension over Packet Networks as a Local Loop Replacement

TDMoIP offers the CLEC an alternative method of extending services to their customers. Traditionally it was necessary to lease the Local Loop from the incumbent local exchange carrier (ILEC), but now any packet network will do. All voice and data services that traditionally run on T1 or E1 circuits are automatically supported over IP. This not only includes simple PSTN access, but also PRI, Centrex, and VoIP for voice services and ATM, Frame Relay, PPP, ISDN, SNA, X.25 for data services. The packet networks are also no longer limited to synchronous ATM and SONET, but can run equally well on 10/100BaseT wireless radios, Gigabit Ethernet, or any other network.

In this application, T1/E1 circuit extension is made possible by TDMoIP technology. The CLEC now has an alternative to leasing "unbundled" facilities from the ILEC.

Multi-tenant broadband buildings are wired to offer high speed data to each suite over fiber or copper lines. In each building, the CLEC has a small POP (typically in the basement). This POP is then connected to the CLEC Central Office using an optical network made up of Gigabit Ethernet, SONET, or even FDDI (this broadband connection could also be wireless or laser). Ethernet or IP is used to provide high speed data. TDMoIP is then used to extend traditional T1 or E1 circuits from the central office to each building over this network. In this way, the tenants can be offered a variety of services either directly from this CLEC or from third-party providers contracted by the CLEC. This architecture is also relevant for the Building or Data CLEC that simply wants to provide basic transport service to other CLECs or IXCs and lets them offer bundled services over these leased lines.

PSTN Access over Fiber IP-based Networks with Redundancy

Telephony services such as PSTN access, Centrex and VoIP can simply and inexpensively be provided to customers over a metropolitan area network (MAN). Alternate routing and switching capabilities found in Gigabit Ethernet switches and Terabit routers can be used to reroute traffic quickly in the event of network failure. Private point-to-point leased line services between customer sites can also be offered over the same fiber IP-based network.

Traditional T1/E1 Leased Line Services over IP Networks

Carriers with a high speed IP infrastructure can take advantage of under-utilized bandwidth and offer virtual T1/E1 leased lines. If packet delay and loss through the network is low, then this service is just like any other T1/E1 leased line. In this way, carriers can also offer E1 services in the U.S. and T1 circuits internationally.

Below, the customer is provided with point-to-point T1 or E1 leased lines.

Grooming of T1, E1 and Fractional Services over Routed IP Networks

In this application, a pure IP network architecture can be used not only for data and management, but also for voice and circuit extension over IP. The ability of the TDM over IP device to groom DS0s and extend T1 or E1 circuits efficiently and transparently over IP networks provides service providers with a simple, low cost alternative to the traditional digital cross connect (DACS). In this way, the service provider can use the efficiency and flexibility of IP routing to extend its network into tier 4 towns and multi-tenant broadband buildings without compromising integrity and quality.

The network can be divided into four segments starting at the multi-tenant building where the customers can be offered a variety of services, which when bundled together provide the convenience of a single bill and single point of contact. Bundled services do not need to originate from the same service POP. In the above diagram, an IP service POP provides Web hosting and Internet access, and a TDM service POP acts as the gateway to third-party service providers such as voice CLECs and IXCs. Each network segment is explained below in more detail.

Multi-Tenant Buildings

The building CLEC will frequently want to use the building's existing copper wire infrastructure to deliver services to the customers' office suites. xDSL modems and routers are usually installed in the office suites with a DSLAM in the basement to concentrate the data sources for transmission to the network. In this scenario, voice services continue to be provided by the ILEC. If the CLEC, however, wants to increase revenue and market share, he must be able to also offer voice and leased line services. Integrated access devices (IADs) with SDSL links provide one way of doing this. However, it is important that the services that the CLEC offers are not inferior to those currently delivered by the ILEC. In the IP environment, most IP-IADs compress and packetize the voice using VoIP techniques which are not 100% transparent, and therefore compromise the level of service with limited support for V.90 modems, faxes and standard voice features such as 911, *67 and caller ID. This alternative also adds considerable delay, complexity and cost that will make the business customer more reluctant to switch service.

An alternative embodiment is to provide identical service with the same analog voice and digital lines, but now use TDMoIP technology with the TDM over IP device to provide a scalable and efficient grooming platform. Voice and leased lines from the TDM over IP device and data from the DSLAM can then be aggregated and routed across the network. The TDM over IP device solution is scalable because it is now possible to use IP to grow the voice and leased line services from a single DS0 to many T1 or E1 circuits without needing a digital cross connect (DACS). In addition, increasing bandwidth to the building is simple and inexpensive because just the link interface of the access router needs to be matched to that of the line coming from the network. Everything behind the router stays the same because it is all IP.

ILEC Network

In most cases today, the building CLEC still depends on the unbundled Local Loop from the incumbent local exchange carriers (ILEC) to connect multi-tenant buildings to the service POPs. T1 circuits can be added and MLPPP or MLFR can be used to bond the circuits together to provide a high speed IP link. T3 and OC3 provide even higher speed options. If a wireless, laser or optical alternative becomes available then the CLEC can easily take advantage of the fact that IP works with any link layer protocol, including Ethernet and SONET. Therefore, building a pure IP access network makes this transition simpler.

IP Service POP

This service POP routes IP packets. Packets containing voice and leased line services can simply be forwarded to the TDM Service POP. Similarly, packets requiring ISP value-added services, such as Web hosting, can be forwarded to the relevant servers. In addition, simple Internet access can be provided from this POP.

Private leased line services can also be offered between buildings by tunneling DS0 bundles across this CLECs IP network. At each of the buildings, an TDM over IP device is responsible for packetizing the TDM bit streams, which are then prioritized and routed between buildings.

TDM Service POP

IP packet streams carrying voice, ATM, Frame Relay and other tunneled protocols that are not being used for private line services are routed to the TDM Service POP where the circuits are terminated. Using the TDM over IP device –16, it is possible to terminate 768 T1 or E1 circuits in a single 19", 7-foot rack. At this POP, the CLEC may decide to offer voice services by connecting the T1 or E1 circuits to its own class 4/5 switch or VoIP gateway, or deliver the circuits directly to third-party providers such as Voice CLECs and IXCs.

The Voice CLEC would receive voice channels in DS0 bundles and provides voice services ranging from regular PSTN access and Centrex to clearinghouses and VoIP for lowest cost international telephony services. The IXC (or Data CLEC) could provide traditional data services such as ATM and Frame Relay over these full or fractional T1 or E1 circuits. For example, let us assume a large corporation uses Sprint's ATM network for connecting its head office to all branches, and now wants to open an office in one of the CLEC multi-tenant buildings. It would now be possible for the CLEC to extend a T1 circuit from the IXC at the TDM service POP to the office suite as a leased line, and the new branch office will receive ATM service just like any other branch.

Cellular Carrier's IP Backbone

Cellular carriers' networks are based on TDM technologies. Connectivity between the base stations (BTSs), base station controllers (BSCs), and the mobile switching center (MSC) is achieved using TDM microwave links and T1/E1 leased lines. Until recently, ATM was the most logical alternative. Because of pressure from environmental groups, cellular carriers are looking for an alternative to microwave, and leased lines are costly. With the introduction of QoS in Gigabit Ethernet networks and the availability of TDMoIP, IP is very seriously considered as the preferred solution.

Third-generation cellular (UMTS) vendors are in advanced stages of implementing TDMoIP solutions where IP networks are the cellular backbone. In the future, current and third-generation cellular devices will be co-located to access on an IP-based backbone.

Conclusion

Circuit extension over IP using TDMoIP technology provides the benefits of IP networks without the dangers of a new technology. It supports legacy telephony switches and PBXs over data infrastructures with no loss of functionality. In addition, it empowers IP networks with leased line services for voice, ATM, Frame Relay, SNA, and so on. Finally, the fact that it is simple, inexpensive and transparent to all signaling and protocols makes TDMoIP an ideal complement to Gigabit Ethernet in Next Generation Networks. The present invention offers a solution for transparently transferring E1 or T1 (or fractional E1/T1) TDM services over widely deployed high speed IP networks. This technology can be used as a migration path to Voice over IP or a complementary solution to VoIP in places where a voice over IP solution is not suitable.

A system and method has been shown in the above embodiments for the effective implementation of TDM over IP (IP circuit emulation service). While various preferred embodiments have been shown and described, it will be understood that there is no intent to limit the invention by such disclosure, but rather, it is intended to cover all modifications and alternate constructions falling within the spirit and scope of the invention, as defined in the appended claims. For example, the present invention should not be limited by software/program, computing environment or specific computing hardware.

What is claimed is:

1. A computer based communications system implementing TDM over an Internet Protocol network (TDM over IP, TDMoIP), said system comprising:
   an IP network;
   a TDM source stream;
   decoder to decode said TDM source stream;
   a converter to convert one or more parts of said decoded TDM source stream into a circuit emulation service (CES) structure;
   a segmenter to partition said converted one or more parts and remove cell header(s);
   packetizer receiving output from said segmenter and packetizing thereof, and
   wherein packets output from said packetizer are an IP compatible format suitable for transfer over said IP network.

2. A computer based communications system implementing TDM over an Internet Protocol network (TDM over IP, TDMoIP), as per claim 1, wherein said TDM source stream comprises a E1/T1 TDM stream.

3. A computer based communications system implementing TDM over an Internet Protocol network (TDM over IP, TDMoIP), as per claim 2, wherein said decoded E1/T1 TDM stream is delivered over a PCM bus.

4. A computer based communications system implementing TDM over an Internet Protocol network (TDM over IP, TDMoIP), as per claim 3, wherein said circuit emulation service conforms to ATM forum specification AF-VTOA-0078 (1997), known as CES 2.0.

5. A computer based communications system implementing TDM over an Internet Protocol network (TDM over IP, TDMoIP), as per claim 1, wherein said circuit emulation service(CES) structure comprises any of three types: unstructured, structured or structured with CAS.

6. A computer based communications system implementing TDM over an Internet Protocol network (TDM over IP, TDMoIP), as per claim 1, wherein said segmenter partitions into cells.

7. A computer based communications system implementing TDM over an Internet Protocol network (TDM over IP, TDMoIP), as per claim 6, wherein said partitioning reflects the ITU-T 363.1 standard.

8. A computer based communications system implementing TDM over an Internet Protocol network (TDM over IP, TDMoIP), as per claim 1, wherein said output from said segmenter comprises AAL1 headers and payload.

9. A computer based communications system implementing TDM over an Internet Protocol network (TDM over IP, TDMoIP), as per claim 1, wherein said packetizer packets the cells into UDP over IP frames adding connection information into the UDP header.

10. A computer based communications system implementing TDM over an Internet Protocol network (TDM over IP, TDMoIP), as per claim 9, wherein said connection information includes at least a destination IP specifying a remote device and addressing specifying a destination E1/T1 port and bundle which is a group of time slots.

11. A computer based communications system implementing TDM over an Internet Protocol network (TDM over IP, TDMoIP), as per claim 1, wherein said system further comprises a receiving section acquiring packets output from said packetizer and transferred across said IP network.

12. A computer based communications system implementing TDM over an Internet Protocol network (TDM over IP, TDMoIP), as per claim 11, wherein said receiving section comprises:
   a cell extractor to strip the cells from said UDP payload;
   a reassembler to restructure said stripped cells according to circuit emulation service(CES) standards;
   a packet delay variation buffer to compensate for network delay variation;
   a framer and encoder, and
   wherein output from said framer and encoder is transmitted as a TDM stream.

13. A computer based communications system implementing TDM over an Internet Protocol network (TDM over IP, TDMoIP), as per claim 1, wherein said system further comprises an adaptive clock.

14. A computer based communications system implementing TDM over an Internet Protocol network (TDM over IP, TDMoIP), as per claim 12, wherein said system further comprises an adaptive clock used to regenerate a E1/T1 receive clock.

15. A computer based communications system implementing TDM over an Internet Protocol network (TDM over IP, TDMoIP), as per claim 14, wherein said adaptive clock comprises a monitored fill buffer and PLL.

16. A computer based communications system implementing TDM over an Internet Protocol network (TDM over IP, TDMoIP), as per claim 15, wherein when said monitored fill buffer is filling up, the regenerated clock rate will be increased and when said monitored fill buffer is emptying, the regenerated clock rate will be decreased.

17. A computer based communications system implementing TDM over an Internet Protocol network (TDM over IP, TDMoIP), as per claim 1, wherein said system is implemented across networks comprising any of LANs, WANs, cellular, Internet or Web based networks.

18. A computer based method implementing TDM over an Internet Protocol network (TDM over IP, TDMoIP), comprising the following steps for TDM up and down stream link port flow:
   A. said down link flow of said TDM stream comprising the steps:
      (1) receiving one or more TDM signals;
      (2) decoding said received one or more TDM signals from line and frame alignment;
      (3) building structures according to circuit emulation service(CES) standards;

(4) segmenting said structures into ATM cells;
(5) stripping the ATM header;
(6) packetizing the stripped cells into UDP over IP Ethernet frames, and
(7) transmitting said packetized cells over IP networks;

B. said up link flow of said TDM stream uplink port comprising the steps:
(1) receiving Ethernet frames from said IP network;
(2) stripping the ATM cells from a UDP payload;
(3) reassembling said stripped cells according to circuit emulation service(CES) standards;
(4) compensating for network delay variations;
(5) framing said reassembled cells;
(6) encoding said framed output;
(7) transmitting said encoded output over TDM lines.

19. A computer based method implementing TDM over an Internet Protocol network (TDM over IP, TDMoIP), as per claim 18, wherein said TDM signals comprises a E1/T1 TDM stream.

20. A computer based method implementing TDM over an Internet Protocol network (TDM over IP, TDMoIP), as per claim 19, wherein said decoded E1/T1 TDM signals is delivered over a PCM bus.

21. A computer based method implementing TDM over an Internet Protocol network (TDM over IP, TDMoIP), as per claim 18, wherein said circuit emulation service conforms to ATM forum specification AF-VTOA-0078 (1997), known as CES 2.0.

22. A computer based method implementing TDM over an Internet Protocol network (TDM over IP, TDMoIP), as per claim 18, wherein said circuit emulation service(CES) structure comprises any of three types: unstructured, structured or structured with CAS.

23. A computer based method implementing TDM over an Internet Protocol network (TDM over IP, TDMoIP), as per claim 18, wherein said segmenting said structures into ATM cells reflects the ITU-T 363.1 standard.

24. A computer based method implementing TDM over an Internet Protocol network (TDM over IP, TDMoIP), as per claim 18, wherein the output from segmenting said structures into ATM cells comprises AAL1 headers and payload.

25. A computer based method implementing TDM over an Internet Protocol network (TDM over IP, TDMoIP), as per claim 18, wherein said packetizing step packets the cells into UDP over IP frames adding connection information into a UDP header.

26. A computer based method implementing TDM over an Internet Protocol network (TDM over IP, TDMoIP), as per claim 25, wherein said connection information includes at least a destination IP specifying a remote device and addressing specifying a destination E1/T1 port and bundle which is a group of time slots.

27. A computer based method implementing TDM over an Internet Protocol network (TDM over IP, TDMoIP), as per claim 1, wherein said compensation step is implemented with an adaptive clock.

28. A computer based method implementing TDM over an Internet Protocol network (TDM over IP, TDMoIP), as per claim 27, wherein said adaptive clock is used to regenerate a E1/T1 receive clock.

29. A computer based method implementing TDM over an Internet Protocol network (TDM over IP, TDMoIP), as per claim 28, wherein said adaptive clock comprises a monitored fill buffer and PLL.

30. A computer based method implementing TDM over an Internet Protocol network (TDM over IP, TDMoIP), as per claim 29, wherein when said monitored fill buffer is filling up, the regenerated clock rate is increased and when said monitored fill buffer is emptying, the regenerated clock rate is decreased.

31. A computer based method implementing TDM over an Internet Protocol network (TDM over IP, TDMoIP), as per claim 18, wherein said compensation step is implemented by the following steps:
(1) loading a buffer with TDM bytes extracted from arriving frames;
(2) emptying said buffer after reaching at least a half filled state according to a rate set by a transmission clock;
(3) generating a fill indication;
(4) comparing the fill indication to a nominal fill level;
(5) filtering said output to produce an adaptive clock, and
(6) recursively using said adaptive clock as said transmission clock in step (2).

32. A computer based method implementing TDM over an Internet Protocol network (TDM over IP, TDMoIP), as per claim 31, wherein step (2) is implemented with a PLL.

33. A computer based method implementing TDM over an Internet Protocol network (TDM over IP, TDMoIP), as per claim 18, wherein said method is implemented across networks comprising any of LANs, WANs, cellular, Internet or Web based networks.

34. A computer based method implementing TDM over an Internet Protocol network (TDM over IP, TDMoIP), comprising the following:
receiving one or more TDM signals;
decoding said received one or more TDM signals;
building ATM CES structures using AAL1 cells without a cell header;
encapsulating said ATM CES structures into UDP over IP frames, and
transmitting said UDP over IP frames over UP networks.

35. A computer based method implementing TDM over an Internet Protocol network (TDM over IP, TDMoIP), as per claim 34, further comprising specifying a destination of the AAL1 cells termination Interworking function.

36. A computer based method implementing TDM over an Internet Protocol network (TDM over IP, TDMoIP), as per claim 35, wherein said specifying step utilizes a UDP source port field.

37. A computer based method implementing TDM over an Internet Protocol network (TDM over IP, TDMoIP), as per claim 34, further comprising the step of compensating for network delays.

38. A computer based method implementing TDM over an Internet Protocol network (TDM over IP, TDMoIP), as per claim 37, wherein said compensation step is implemented by the following steps:
(1) loading a buffer with TDM bytes extracted from arriving frames;
(2) emptying said buffer after reaching at least a half filled state according to a rate set by a transmission clock;
(3) generating a fill indication;
(4) comparing the fill indication to a nominal fill level;
(5) filtering said output to produce an adaptive clock, and
(6) substituting said adaptive clock as said transmission clock in step (2).

39. A computer based communications system implementing TDM over an Internet Protocol network (TDM over IP, TDMoIP), as per claim 1, wherein said system implements voice over IP (VoIP).

40. A computer based method implementing TDM over an Internet Protocol network (TDM over IP, TDMoIP), as per claim 18, wherein said method implements voice over IP (VoIP).

41. A computer based method implementing TDM over an Internet Protocol network (TDM over IP, TDMoIP), as per claim 37, wherein said method implements voice over IP (VoIP).

* * * * *